INVENTOR.
Arne R. Severinsen
BY
Fred C. Matheny
ATTORNEY

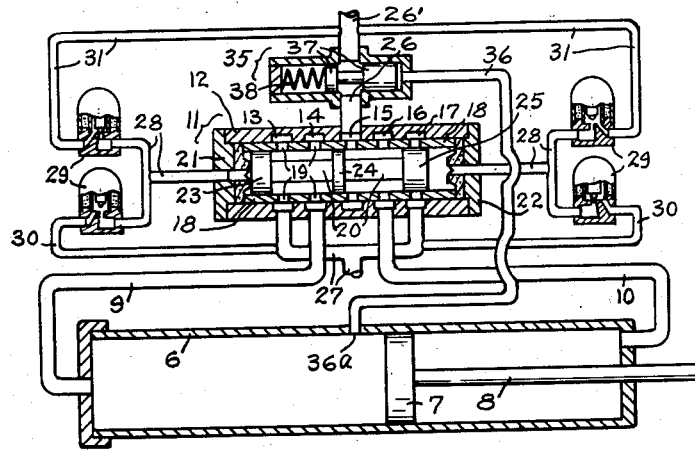
July 12, 1960     A. R. SEVERINSEN     2,944,530
PNEUMATIC CONTROL MEANS FOR RECIPROCABLE PISTONS
Filed April 29, 1959     2 Sheets-Sheet 1
INVENTOR.
Arne R. Severinsen
BY
Fred C. Matheny July 12, 1960 A. R. SEVERINSEN 2,944,530
PNEUMATIC CONTROL MEANS FOR RECIPROCABLE PISTONS
Filed April 29, 1959 2 Sheets-Sheet 2

United States Patent Office 2,944,530
Patented July 12, 1960

2,944,530

PNEUMATIC CONTROL MEANS FOR RECIPROCABLE PISTONS

Arne R. Severinsen, Seattle, Wash., assignor of one-half to Alfred C. Johnson, Seattle, Wash.

Filed Apr. 29, 1959, Ser. No. 809,824

7 Claims. (Cl. 121—158)

My invention relates to pneumatic control means for reciprocable pistons and the general object of my invention is to provide improved means for controlling the operation of a piston in a pneumatic cylinder by controlling the cut-off of air under pressure admitted to the cylinder and, in some instances, by controlling the exhaust of air from the cylinder.

A further object of my invention is to provide control devices operated by air under pressure taken from a predetermined point intermediate the length of a pneumatic cylinder for cutting off the supply of air under pressure to said cylinder when a piston reciprocable in said cylinder passes said predetermined point in moving in either direction in said cylinder.

Another object is to provide control devices operated by air under pressure taken from two different points intermediate the length of a pneumatic cylinder for cutting off a supply of air under pressure to said cylinder when a piston reciprocable in said cylinder passes one of said points in moving in one direction and when the piston passes the other point in moving in the other direction.

Another object is to provide control devices operated by air under pressure taken from two different points intermediate the length of a pneumatic cylinder for closing shut-off valves in conduits through which air is exhausted from said cylinder to pneumatically cushion the movement of a piston reciprocable in said cylinder as said piston nears the end of its travel in each direction in the cylinder.

Other objects are to provide pneumatic control means of this type which will bring about a saving in the use of compressed air and which will reduce shock and vibration of a piston movable in a pneumatic cylinder and of devices which are connected with and operated by said piston.

Other objects of my invention will be apparent from the following description and accompanying drawings.

My invention can be applied to and used in connection with various pneumatic devices in which the admission of air under pressure to and the exhaust of air from a pneumatic cylinder having a reciprocable piston therein is controlled by a reversing valve. One such pneumatic device to which this invention can be applied is disclosed in U.S. Patent No. 2,605,079, issued July 29, 1952, and obviously this invention can be applied to other pneumatic devices of this general type.

In the accompanying drawings—

Figure 1 is a diagrammatic view, partly in section, showing an embodiment of my invention wherein a pressure operated shut-off valve is interposed in the air pressure supply means of a hydraulic cylinder and connected at one point with said cylinder to modify the cut off of air under pressure to said cylinder.

Fig. 2 is a similar view illustrating the use of two control valves having connection at two spaced apart points with a pneumatic cylinder.

Fig. 3 is a view similar to Fig. 2 illustrating the use of two control valves, one of which is a double check valve and is connected at two spaced apart points with a pneumatic cylinder.

Like reference numerals refer to like parts throughout the several views.

Figure 4:
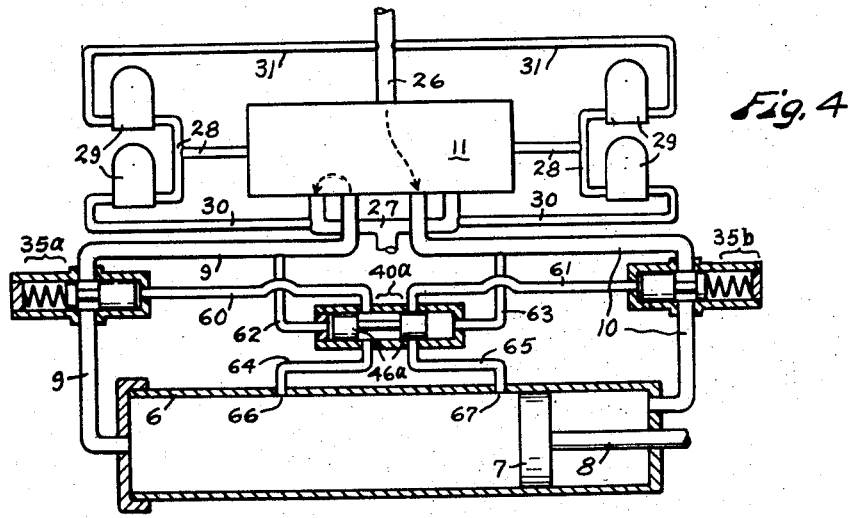
Fig. 4 is a diagrammatic view illustrating the use of three control valves connected with a pneumatic cylinder in such a manner as to control the exhaust of air from the cylinder and cushion the movement of a piston as it approaches the ends of the cylinder.

Figure 1 shows a pneumatic cylinder 6 having therein a piston 7 which is connected with a piston rod 8. Two air conduits 9 and 10 communicatively connect the respective ends of the cylinder 6 with a reversing valve 11. The reversing valve 11 may be of any suitable type which can be actuated to reverse the connection between an air pressure supply conduit 26 and an exhaust conduit 27 of the valve and the two ends of the pneumatic cylinder 6, the reversal of the valve 11 usually taking place when the piston 7 is at or near the ends of its stroke. One reversing valve 11 which will accomplish this desired purpose is illustrated in Fig. 1 and more fully disclosed in the U.S. patent hereinbefore identified.

The reversing valve 11 comprises a tubular housing 12 having in its inner wall five spaced apart annular grooves 13, 14, 15, 16 and 17. A port sleeve 18 fits telescopically within the housing 12 and has perforations 19 which communicate with the grooves 13 to 17 inclusive. A piston rod 20 has three spaced apart head members 23, 24 and 25 which fit snugly but reciprocably within the sleeve 18. End closure members 21 and 22 are provided on the two respective ends of the housing 12. The inlet conduit 26 for air under pressure is connected with the housing 12 and communicates with the medial groove 15. The exhaust conduit 27 is connected with the housing 12 and communicates with the two endmost grooves 13 and 17. The two conduits 9 and 10 connect the respective annular valve grooves 14 and 16 with the two ends of the cylinder 6. When the valve pistons 23, 24 and 25 are in the position shown in Fig. 1 the conduit 9 communicates with the exhaust conduit 27 and the conduit 10 communicates with the air pressure inlet conduit 26. When said valve pistons 23, 24, 25 are moved as far as possible to the right from the positions in which they are shown in Fig. 1 then the communication of conduits 9 and 10 as respects pressure inlet conduit 26 and exhaust conduit 27 will be reversed. The valve piston assembly 20, 23, 24, 25 is operated by air entering and exhausting by way of conduits 28 and this air is controlled by four electrically operated pilot valves 29. Two of the pilot valves 29 are connected by conduits 30 with the exhaust conduit 27 of the reversing valve 11 and the other two pilot valves 29 are connected by conduits 31 with an extension conduit 26' of the air pressure supply conduit 26. The pilot valves 29 can be selectively energized by any suitable means at regular or irregular intervals to stroke the reversing valve back and forth and each time the reversing valve is operated the piston 7 will be caused to make one stroke.

In the embodiment of my invention shown in Fig. 1 I interpose a normally open pressure operated shut-off valve 35 in the air pressure supply line formed by conduits 26 and 26' and I connect said valve 35 by a conduit 36 with the cylinder 6 intermediate and preferably substantially mid way between the two ends of said cylinder. The valve 35 has a valve piston 37 which is yieldingly held in an open position as respects conduits 26 and 26' by a compression spring 38. The admission of air under pressure to the conduit 36 will overcome the force of the spring 38 and move the valve piston 37 to the left and this will close the passageway between conduits 26 and 26' and thus cut off the supply of air under pressure by way of the reversing valve 11 to the cylinder 6.

In the operation of the valve 35, when all of the parts are in the positions in which they are shown in Fig. 1 air under pressure from conduit 26' will pass by way of shut-off valve 35, conduit 26, reversing valve 11 and conduit 10 into the right end of cylinder 6 and move piston 7 to the left. As soon as piston 7 passes the point of connection 36a of conduit 36 with cylinder 6 some of the compressed air back of piston 7 passes through conduit 36 to valve housing 35 and moves valve piston 37 to the left into a closed position. This cuts off the supply of air under pressure to the cylinder 6 and causes the air in cylinder 6 to work expansively in moving the piston 7 throughout the remainder of its stroke. When valve 11 is reversed after the piston 7 has reached the left end of its stroke the right end of the cylinder 6 is opened to exhaust through conduit 10, pressure drops in conduit 36, valve member 37 of shut-off valve 35 is moved by the spring 38 to an open position and air pressure is supplied by way of valve 11 and conduit 9 to move the piston 7 to the right. As the piston 7 moves toward the right past the point of connection 36a of conduit 36 with cylinder 6 air pressure will enter conduit 36 and the supply of compressed air driving said piston 7 will be cut off by valve 35 in a similar manner.

In the embodiment of my invention shown in Fig. 2 the cylinder 6, reversing valve 11 and shut-off valve 35 are duplicates of those shown in Fig. 1 and like parts thereof, in so far as shown, are similarly numbered.

In the structure shown in said Fig. 2 a selector valve 40 is interposed between the shut-off valve 35 and the cylinder 6. A conduit 41, corresponding to conduit 36 of Fig. 1, connects the selector valve 40 with the shut-off valve 35 and two conduits 42 and 43 connect said selector valve 40 with the cylinder 6 at spaced apart points 44 and 45 respectively intermediate the length of said cylinder 6. The selector valve 40 has therein a longitudinally movable piston member 46 capable of reversing the open and closed relation of conduits 42 and 43 relative to conduit 41. Two selector valve control conduits 47 and 48 connect opposite ends of the selector valve 40 with the respective main air inlet and exhaust conduits 9 and 10.

In the operation of the structure shown in Fig. 2, when the shut-off valve 35 is open and the reversing valve 11 is supplying air pressure by way of conduit 10 to the right end of cylinder 6 the piston 7 will be moving to the left and the conduit 43 will be closed by selector valve piston member 46 due to pressure supplied through selector valve control conduit 48. When the piston 7 passes point 45 no change will take place because valve 46 will have conduit 43 closed but when piston 7 passes point 44 in moving to the left pressure from cylinder 6 will be supplied by way of conduit 42, selector valve 40 and conduit 41 to close the shut-off valve 35 and cut off pressure to cylinder 6. The piston 7 will then operate under expansion throughout the remainder of its stroke. When the valve 11 is reversed the piston 7 will be moved toward the right end of the cylinder 6 in a similar manner and no change will occur when the piston 7 passes the point 44 but air under pressure will be cut off to cylinder 6 when said piston passes the point 45. Obviously the positions of the cut off points 44 and 45 lengthwise as respects cylinder 6 can be varied to suit different operating conditions.

In the valve arrangement shown in Fig. 2 the cut off of pressure occurs when the piston passes the second point of connection of the two control conduits 42 and 43 with the cylinder. Fig. 3 shows a valve arrangement in which cut off occurs when the piston passes a first point of connection of two similar conduits with a cylinder.

In the embodiment of my invention shown in Fig. 3 the cylinder 6, reversing valve 11, and shut-off valve 35 are duplicates of those shown in Fig. 1 and like parts thereof, in so far as they are shown, are similarly numbered.

In said Fig. 3 a double check valve 50 is interposed between the shut-off valve 35 and the cylinder 6. A conduit 51 connects the double check valve 50 with the shut off valve 35 and two conduits 52 and 53 connect said double check valve 50 with the cylinder 6 at spaced apart points 54 and 55 intermediate the length of said cylinder. The double check valve 50 has therein a ball 56 capable of closing said valve as respects either conduit 52 or 53 while leaving said valve open as respects the other of said conduits.

In the operation of the devices shown in Fig. 3, when the shut-off valve 35 is open and the reversing valve 11 is supplying pressure by way of conduit 10 to the right end of the cylinder 6 the piston 7 will be moved to the left. As soon as piston 7 passes point 55 pressure from the cylinder 6 will pass through the conduit 53, valve 50 and conduit 51 and close the shut-off valve 35. At the same time this pressure will move the ball 56 and hold closed the passageway to conduit 52 thus preventing air pressure from by-passing the moving piston 7. The closing of shut-off valve 35 will cut off pressure to the right end of cylinder 6 and the piston 7 will be moved throughout the remainder of its stroke by the expansion of the air to the right of it. In a similar manner, air under pressure moving the piston 7 in the opposite direction, or toward the left in Fig. 3, will be cut off when the piston 7 passes the point of connection 54 of conduit 52 with cylinder 6. Movement of piston 7 to the left of point 54 will be accomplished by expansion of the air driving said piston.

The embodiment of my invention shown in Fig. 4 provides for closing the exhaust conduit toward which the piston is moving, for cushioning purposes, before the piston reaches the end of its stroke. In said Fig. 4 the cylinder 6 and reversing valve 11 are duplicates of those shown in Fig. 1 and like parts thereof, in so far as shown, are similarly numbered. Also two shut-off valves 35a and 35b, shown in Fig. 4, are similar in construction and mode of operation to the shut-off valve 35 shown in Fig. 1 but are used in a different manner. Said shut-off valves 35a and 35b are interposed in the respective main inlet and exhaust conduits 9 and 10 and are respectively connected by control conduits 60 and 61 with a selector valve 40a containing a valve member 46a. The valve 40a is similar to the selector valve 40 of Fig. 2 but is differently connected. Two selector valve control conduits 62 and 63 connect the selector valve 40a with the respective main pressure and exhaust conduits 9 and 10 at points between the reversing valve 11 and shut off valves 35a and 35b. A third pair of conduits 64 and 65 connect said selector valve 40a with the cylinder 6 at spaced apart points 66 and 67 respectively intermediate the length of said cylinder.

In the operation of the apparatus shown in Fig. 4, when the reversing valve 11 has conduit 10 communicatively connected with pressure conduit 26 and conduit 9 open to exhaust conduit 27 and when both of the shut-off valves 35a and 35b are open, pressure from conduit 10 passing through conduit 63 will move the valve member 46a in selector valve 40a to the left. This will close selector valve 40a as respects conduits 61 and 65 and open said selector valve 40a as respects conduits 60 and 64. Also this pressure will enter the right end of cylinder 6 and move piston 7 to the left. When piston 7, in moving to the left, passes point 67 no change will take place because the valve member 46a is closed as respects conduit 65. When said piston, in moving to the left, passes point 66 pressure passing through conduit 64, valve 40a and conduit 60 will close shut-off valve 35a and trap exhausting air in the left end of the cylinder 6 forming a cushion which will increase in pressure as the piston 7 moves toward the end of the cylinder and will cushion and absorb the shock incident to the stopping of the piston and any mechanism that may be connected with said piston.

In a similar manner, movement of the piston 7 from left to right, Fig. 4, will trap air for cushioning and shock absorbing purposes in the right end of cylinder 6 as soon as the piston 7 passes the point 67 of connection of conduit 65 with cylinder 6. This cushioning of the piston 7 is particularly desirable in instances where the piston is moving heavy mechanism which must be stopped with minimum vibration and jar each time the piston comes to the end of its stroke.

Figure 5:
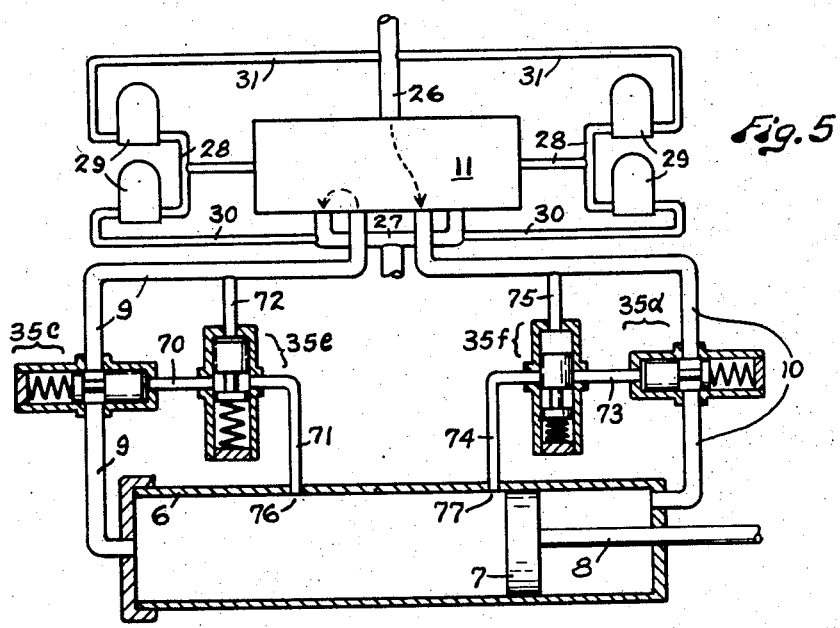
Fig. 5 is a diagrammatic view illustrating the use of four pressure operated shut-off valves connected in such a manner as to control the exhaust of air from a pneumatic cylinder for cushioning or shock absorbing purposes.

The embodiment of my invention shown in Fig. 5 accomplishes the same result as the embodiment shown in Fig. 4 but does so by the use of a different valve arrangement. In said Fig. 5 the cylinder 6 and reversing valve 11 are both duplicates of those shown in Fig. 1 and like parts thereof, in so far as shown, are similarly numbered. Also four shut-off valves 35c, 35d, 35e and 35f, shown in Fig. 5, are similar in construction and mode of operation to the shut-off valve 35 of Fig. 1, but are used in a different manner. The two shut-off valves 35c and 35d are interposed in the respective main air pressure and exhaust conduits 9 and 10. The two opposite sides of the shut-off valve 35e are respectively connected by conduits 70 and 71 with an end of the shut-off valve 35c and with the cylinder 6. An end of the shut-off valve 35e is connected, for control purposes, by a conduit 72 with the conduit 9 at a point between the shut-off valve 35c and the reversing valve 11. The two sides of the shut-off valve 35f are respectively connected by conduits 73 and 74 with an end of the shut-off valve 35d and with the cylinder 6. An end of the shut-off valve 35f is connected, for control purposes, by a conduit 75 with the conduit 10 at a point between the shut-off valve 35d and the reversing valve 11. The two points of connection 76 and 77 of the respective conduits 71 and 74 with the cylinder 6 are spaced from each other and spaced inwardly from the ends of said cylinder.

In the operation of the apparatus shown in Fig. 5, when the reversing valve 11 has conduit 10 open to pressure conduit 26 and conduit 9 open to exhaust conduit 27 the valves 35c, 35e and 35d will all be open and the valve 35f will be closed. This allows air pressure to enter the right end of the cylinder 6 and move the piston 7 to the left. No change will occur when the piston 7, in moving to the left, passes the point 77 because shut-off valve 35f will be closed. When said piston 7 passes the point 76 air under pressure passing through conduit 71 and valve 35e will close shut-off valve 35c and trap the air that remains in the left end of cylinder 6 for the purpose of cushioning the piston. When the valve 11 is reversed the conduit 71 will be open to exhaust by way of conduit 10 allowing valve 35c to open. At the same time pressure admitted to conduit 9 will pass through conduit 72 and close the shut-off valve 35e. Also pressure will pass through the then open shut-off valve 35c into the left end of the cylinder 6 and move piston 7 to the right. As the piston 7 moves to the right past point 76 no change will occur but when said piston passes point 77 the shut-off valve 35d will be closed trapping air for cushioning purposes in the right end of the cylinder 6.

The foregoing description and accompanying drawings clearly disclose preferred embodiments of my invention but it will be understood that changes may be made within the scope of the following claims.

I claim:

1. Means for controlling the operation of a reciprocable piston in a pneumatic cylinder, comprising a reversing valve; an air pressure supply conduit communicatively connected with said reversing valve; two main air conduits communicatively connecting said reversing valve with the respective end portions of the pneumatic cylinder; a normally open pressure controlled air shut-off valve in said air pressure supply conduit capable of shutting off the supply of air to said reversing valve; and a control conduit having one end communicatively connected with said air shut-off valve and the other end communicatively connected with the cylinder at a predetermined point between the two ends of said cylinder, whereby when the piston is moved past the point of connection of the control conduit with the cylinder air under pressure from the cylinder will close said shut-off valve.

2. In pneumatic control means, a cylinder; a piston reciprocable in said cylinder; a reversing valve; an air pressure supply conduit communicatively connecting said reversing valve with a source of supply of compressed air; two main air conduits communicatively connecting the respective end portions of said cylinder with said reversing valve; a shut-off valve in said air pressure supply conduit capable of shutting off the supply of air to said reversing valve; a spring normally holding said shut-off valve open, said shut-off valve being capable of being closed by admission of air pressure thereto; and a control conduit connecting said shut-off valve with said cylinder at a predetermined location between the two ends of said cylinder, whereby air under pressure which is moving the piston will be admitted to said shut-off valve to close said shut-off valve and interrupt the supply of air to said cylinder when said piston is moved past the point of connection of said control conduit with said cylinder.

3. In pneumatic control means, a cylinder; a piston reciprocable in said cylinder; a reversing valve having an air inlet port and an air exhaust port, an air pressure supply conduit communicatively connecting the air inlet port of said reversing valve with a source of supply of compressed air, two main air conduits communicatively connecting the respective end portions of said cylinder with said reversing valve, said reversing valve having valve means capable of reversing the connection between said two main air conduits and the inlet and exhaust ports of said valve; a shut-off valve in said air pressure supply conduit; a spring normally holding said shut-off valve open, said shut-off valve being capable of being closed by admission of air pressure thereto; a pressure operated two way selector valve; a shut-off valve control conduit connecting said selector valve with said shut-off valve; two selector valve control conduits connecting said selector valve with the respective main air conduits which connect the reversing valve with the two ends of the cylinder; two pressure inlet conduits connecting said selector valve with said cylinder at two spaced apart points intermediate the length of said cylinder; and a valve member in said selector valve movable by pressure supplied through said selector valve control conduits and capable of reversal as respects opening and closing communication between said shut-off valve control conduit and the two conduits which connect said selector valve with the spaced apart points of said cylinder, whereby said shut-off valve will be closed when the piston in moving in one direction passes one of said points and in moving in the other direction passes the other point.

4. In pneumatic control means, a cylinder; a piston reciprocable in said cylinder; a reversing valve having an air inlet port and an air exhaust port; an air pressure supply conduit communicatively connecting the air inlet port of said reversing valve with a source of supply of compressed air; two main air conduits communicatively connecting the respective end portions of said cylinder with said reversing valve, said reversing valve having valve means capable of reversing the connection between said two main air conduits and the inlet and exhaust ports of said valve; a shut-off valve in said air pressure supply conduit; a spring normally holding said shut-off valve open, said shut-off valve being capable of being closed by admission of air pressure thereto; a double check valve; a shut-off valve control conduit connecting said double check valve with said shut-off valve; two conduits connecting said double check valve with said cylinder at two spaced apart points intermediate the length of said cylinder, said double check valve selectively passing air under pressure from alternate ends of said cylinder to said shut-off valve control conduit when said piston in moving away from alternate ends of said cylinder passes the first point of connection with the cylinder of a conduit between the cylinder and the double check valve and said double check valve preventing by-passing of air under pressure from one end portion to the other end portion of said cylinder.

5. In pneumatic control means, a cylinder; a piston reciprocable in said cylinder; a reversing valve having an air pressure inlet port and an air exhaust port; an air pressure supply conduit communicatively connecting the inlet port of said reversing valve with a source of supply of compressed air; two main air conduits communicatively connecting the respective end portions of said cylinder with said reversing valve, said reversing valve having valve means capable of reversing the connection between said two main air conduits and the inlet and exhaust ports of said valve; a shut-off valve interposed in each of said main air conduits; a spring normally holding each shut-off valve open, each shut-off valve being capable of being closed by admission of air pressure thereto; a pressure operated two way selector valve; two conduits connecting said selector valve with the respective shut-off valves; two other conduits connecting said selector valve with said cylinder at two spaced apart points intermediate the length of said cylinder and a predetermined distance from the respective ends of said cylinder; and valve means in said selector valve movable by pressure supplied through said selector valve control conduits and capable of reversal as respects opening and closing of communication between the two shut-off valve control conduits and the two conduits which connect said selector valve with the spaced apart points of said cylinder, whereby each shut-off valve will close the air conduit in which it is interposed when the piston in moving toward the cylinder end with which said air conduit is connected passes the point of connection with the cylinder of the adjacent conduit between said cylinder and the selector valve and will trap air for cushioning purposes in the end of the cylinder.

6. In pneumatic control means, a cylinder; a piston reciprocable in said cylinder; a reversing valve having an air pressure inlet port and an air exhaust port; an air pressure supply conduit communicatively connecting the air inlet port of said reversing valve with a source of supply of compressed air; two main air conduits communicatively connecting the respective end portions of said cylinder with said reversing valve, said reversing valve having valve means capable of reversing the connection between said two main air conduits and the inlet and exhaust ports of said valve; and four normally open spring pressed shut-off valves each capable of being closed by air pressure, two of said shut-off valves being respectively interposed in said two main air conduits, the other two shut-off valves controlling the opening of the shut-off valves in the main air conduits and each of said other shut-off valves having three conduits communicatively connecting it respectively with the shut-off valve in the adjacent main air conduit, with the adjacent main air conduit between the shut-off valve therein and the reversing valve and with the cylinder at a point a predetermined distance from the adjacent end of said cylinder, whereby exhaust from said cylinder will be shut off when the piston is moving toward an end of said cylinder passes the predetermined point of connection of the conduit of said other shut-off valve with said cylinder.

7. In pneumatic control means, a pneumatic cylinder; a piston reciprocable in said cylinder; a reversing valve; an air pressure supply conduit communicatively connected with said reversing valve; two main air conduits communicatively connecting said reversing valve with the respective end portions of the pneumatic cylinder; a normally open pressure controlled air shut-off valve in said air pressure supply conduit capable of shutting off the supply of air to said reversing valve; and shut-off valve closing means capable of bringing about the closing of said shut-off valve, said shut-off valve closing means being communicatively connected with said cylinder at least at one predetermined point intermediate the length of said cylinder, whereby when the piston is moved past said predetermined point of communication of said shut-off valve closing means with said cylinder air under pressure from said cylinder will bring about the closing of said shut-off valve.

References Cited in the file of this patent
UNITED STATES PATENTS

| | | |
|---|---|---|
| 2,223,793 | Muir | Dec. 3, 1940 |
| 2,698,517 | Witt | Jan. 4, 1955 |
| 2,735,404 | Komph | Feb. 21, 1956 |
| 2,739,573 | Hamner | Mar. 27, 1956 |